Aug. 19, 1952      J. G. SUTHARD      2,607,718
PROCESS AND APPARATUS FOR CONTROL OF REAGENTS
Filed June 17, 1946
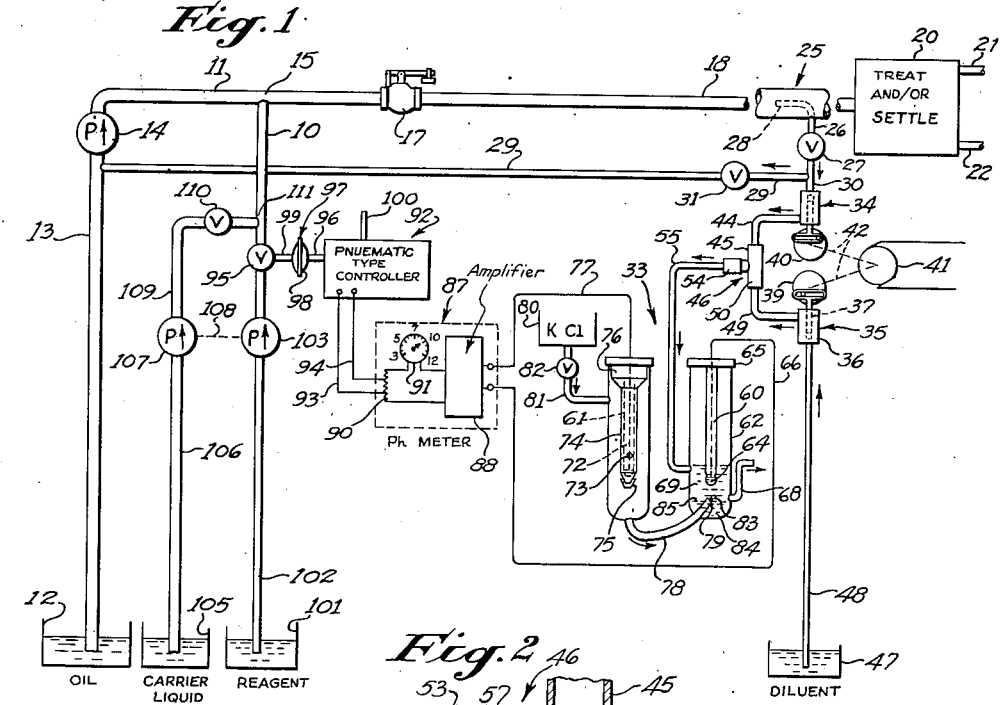
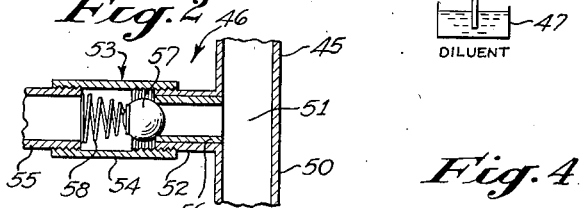
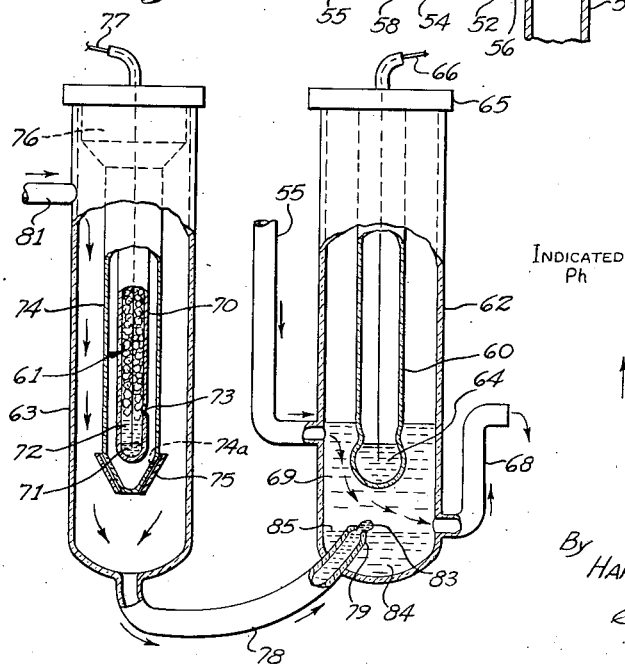
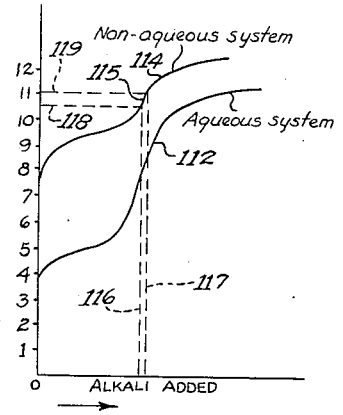
INVENTOR:
JAMES G. SUTHARD,
By HARRIS, KIECH, FOSTER & HARRIS,
FOR THE FIRM
ATTORNEYS Patented Aug. 19, 1952

2,607,718

UNITED STATES PATENT OFFICE 2,607,718

PROCESS AND APPARATUS FOR CONTROL OF REAGENTS

James G. Suthard, Long Beach, Calif., assignor to Petrolite Corporation, a corporation of Delaware Application June 17, 1946, Serial No. 677,381

22 Claims. (Cl. 196—41)

My invention relates to the control of reagents and, more particularly, to a novel method and apparatus for controlling the amount of a reagent that is continuously mixed with a stream of oil to control the acidity and alkalinity of the resulting mixture. The term "oil" as herein used has reference to animal oils (including fish oils), vegetable oils, and mineral oils, although the invention will be particularly described with reference to its use in the reagent treating of crude mineral oils or their distillates.

The invention finds particular utility in the control of acidic or alkaline reagents supplied to an oil stream which may vary in composition from time to time, and comprehends a system, well adapted to large commercial installations, for varying the amount of reagent in accordance with variations in the composition of the oil stream. The invention will be specifically described as applied to the volumetric control of a reagent of substantially constant concentration although the control of concentration of a reagent supplied at substantially constant volume is also comprehended in the herein-used phrase "controlling the amount of a reagent."

The continuous electrometric control of acidity or alkalinity of non-aqueous systems presents many problems previously unsolved, particularly in heterogeneous or multiple-phase systems such as oil-continuous emulsions. The term "non-aqueous system," as herein employed, if without further qualifications, has reference either to homogeneous non-aqueous systems or to dispersions or emulsions in which a non-aqueous medium forms the external phase, the dispersed phase being an acid or alkaline substance, including aqueous solutions of such substances. In aqueous homogeneous systems, the glass electrode has been widely employed in the determination of hydrogen ion concentration or pH. With such aqueous systems the glass electrode is immersed in the aqueous solution to be tested and the electrical potential between the glass electrode and the reference electrode (often a calomel electrode coupled to the solution through a capillary, agar bridge, etc.) is amplified and employed to energize a meter calibrated in pH units.

Identical attempts to use a glass electrode to measure the acidity or alkalinity of non-aqueous systems, particularly multiple-phase systems, have not been successful. It has been determined, however, that such an arrangement can be made responsive to hydrogen ion concentration of the non-aqueous system if the oil is dissolved in a suitable diluent, such as butyl alcohol.

On the other hand, any attempt to supply the necessarily large amounts of such a diluent to a mixed oil-reagent stream is usually impractical, either because of the large amount of diluent required or because the diluent interferes with the intended use or subsequent processing of the mixed stream.

It is an object of the present invention to provide a novel method and apparatus for the continuous electrometric control of the amount of a reagent that is continuously mixed with a stream of oil, to the end that the amount of the reagent shall vary with variations in composition of the oil stream, and irrespective of whether aqueous or non-aqueous systems are involved.

It is a further object of the invention to employ a glass electrode in the accurate formulation of aqueous or non-aqueous systems by employing the potential developed by the electrometric cell, incorporating the glass electrode, for the purpose of controlling the amount of a reagent employed in formulating the aqueous or non-aqueous system.

It is a further object of the invention to mix continuously streams of oil and reagent to form a non-aqueous major stream; to continuously sample this major stream in a manner to produce a non-aqueous minor or sample stream; and to employ this non-aqueous sample stream in the control of the amount of reagent employed in formulating the major stream. An additional and important object is to add to such a non-aqueous sample stream a suitable diluent before flow to the electrometric cell.

The control of reagents producing multiple-phase systems when mixed with an oil has been particularly difficult and has presented problems heretofore unsolved. When operating on multiple-phase streams, it is an object of the present invention to convert a fractional portion thereof into a homogeneous or single-phase stream preparatory to delivery to an electrometric cell. Such a homogeneous or single-phase stream may be a true or colloidal solution distinguishable from the initial heterogeneous multiple-phase dispersion or emulsion by not showing a separate dispersed phase when viewed microscopically and by not having phases readily separable by centrifuging.

When mixing a stream of a reagent with a stream of oil to react with some of the oil components, the reaction is often not instantaneous. In some instances there may be a delay of seconds, minutes, or even hours before the reaction is complete and equilibrium is established. If the electrometric determination is made only after such equilibrium has been established, there may be a substantial time lag between the need for a change in the amount of reagent and the time that this change can be effected. It is an object of the present invention to eliminate this time lag by withdrawing a sample stream from the non-aqueous system before equilibrium has been reached and processing this sample stream to accelerate the reaction, as by converting a heterogeneous sample stream into a homogeneous sample stream, before it reaches the electrometric cell, the reaction being preferably complete at the time the sample stream enters the cell.

It is another object of the invention to employ small metering pumps for metering, pressuring, and bringing together a small sample stream withdrawn from the main stream and a small stream of an alcoholic diluent. A further object is to mix the streams thus brought together preparatory to delivery to an electrometric cell.

Other objects of the invention lie in the provision of a novel electrometric cell. In this connection, it is an object of the invention to provide an electrometric cell of small volume to which a small stream is continuously supplied and from which a small stream is continuously withdrawn so that a liquid body therewithin is constantly renewed, this liquid body being in contact with a glass electrode. Another object is to provide an electrometric cell including a glass electrode and a calomel electrode, and to avoid contamination of the calomel electrode by the liquid to be tested. A further object is to provide an electrometric cell employing a liquid bridge for connecting a calomel electrode to the liquid being tested, which liquid is in contact with a glass electrode, while providing a novel arrangement for constantly renewing an interface between the bridging liquid and the liquid to be tested. It is a further object of the invention to supply continuously a small portion of a bridging liquid to the liquid to be tested, the bridging liquid being discharged in the vicinity of a glass electrode, preferably in a drop by drop manner. It is a further object of the invention to provide an electrometric cell in which dehydration of the bridging liquid is prevented.

Further objects and advantages of the invention will be evident from the following description of an exemplary embodiment.

Referring to the drawing:

Fig. 1 is a diagrammatic view illustrating the preferred elements of the control system when employed for controlling the volume or concentration of a reagent supplied to an oil stream;

Fig. 2 is an enlarged vertical sectional view of the small mixing device shown in Fig. 1;

Fig. 3 is an enlarged vertical sectional view of the electrometric cell shown in Fig. 1; and Fig. 4 is a graphical representation of two typical titration curves, respectively resulting from titrating an aqueous system and a non-aqueous system.

The system shown in Fig. 1 is particularly adapted to the controlled supply of a reagent flowing through a pipe 10 to an oil stream flowing through a pipe 11. The oil, for example, may be withdrawn fro ma storage tank 12 through a pipe 13 leading to a pump 14 which forces a pressured stream of the oil along the pipe 11 and past a junction 15 where the reagent is added as a pumped, continuously-flowing stream produced in a manner to be hereinafter set forth.

Some degree of mixing takes place at the junction 15 but, if desired, an additional mixing action is imposed by a mixing means 17, exemplified as a weight-loaded valve. In the event that the reagent is substantially immiscible with the oil, it is desirable that an intimate mixing action be employed to disperse the reagent into the oil as small droplets, the mixing usually being sufficiently intense to form an oil-continuous emulsion.

The mixed stream is conducted by a pipe 18 to any treating, processing, or settling equipment, not per se a part of the present invention, indicated generally by the numeral 20. For example, if the equipment 20 serves the function of separating the phases of a dispersion or emulsion flowing along the pipe 18, it may be equipped with an effluent pipe 21 for discharging the separated or treated oil and an effluent pipe 22 for discharging the separated reaction products resulting from the chemical reaction between the reagent and some component of the oil. In the equipment 20 any suitable aids for effecting such separation may be employed. For the purpose of the present invention, it is not important to describe the various treatments or processing steps which may be performed in the equipment 20. Suffice it to say that the present invention is concerned with the control of the amount of reagent supplied through the pipe 10 to compensate for a change in character of the oil stream. For example, the pipe 11 may conduct a stream of a mineral oil distillate containing organic acids varying in kind or amount from time to time. It is often desirable to neutralize such oil acidity to a desired extent by mixing an alkaline reagent therewith. In such instance the present invention contemplates controlling the amount of the alkaline reagent supplied through the pipe 10 to the junction 15 in such way that the acidity, alkalinity, or hydrogen ion concentration of the mixed stream passing through the pipe 18 shall be maintained substantially constant or within predetermined limits to aid in the subsequent treatment, processing, or settling in the equipment 20.

The stream flowing along the pipe 18 is hereinafter referred to as the "major stream." It is desirable to sample this stream continuously, this being accomplished by a sampling device 25 which withdraws a small portion of the major stream through a pipe 26 equipped with a valve 27. The simplest and most accurate sampling device consists merely of a small tube 28 centered in the pipe 18, with its open end facing upstream to withdraw continuously and deliver to the pipe 26 a representative small portion of the major stream.

I prefer to withdraw through the pipe 26 a stream of larger volume than that actually required to supply the electrometric cell to be later described. As suggested in Fig. 1, the stream discharged from the valve 27 is divided into two portions, namely, a by-passed portion flowing through a pipe 29 and another portion comprising a sample or minor stream flowing through a pipe 30 preparatory to delivery to the electrometric cell. The by-passed portion flowing through the pipe 29 may be discarded but it is preferred to return this portion to the system, preferably to the intake of the pump 14, for which purpose the pipe 29 is shown as communicating with the pipe 13. The volume of this by-passed portion is quite small, although often substantially larger than the sample stream, and can be controlled by manually setting a valve 31 in the pipe 29.

It is desirable, particularly if the sample or minor stream is of the multiple-phase type, to convert it into a homogeneous or single-phase system before delivery to the electrometric cell, indicated generally by the numeral 33. Also, if the reagent has not been completely reacted, it is desirable to accelerate this reaction so that it is quickly completed prior to the time that the sample stream enters the electrometric cell 33. In non-aqueous systems, it is also desirable that the non-aqueous material of the sample stream be increased in conductivity so that the electrometric cell 33 may employ a glass electrode and still produce an adequate output for operation of the reagent-control equipment to be described. These and other desirable functions may be performed by mixing with the sample stream a suitable diluent, preferably of the alcoholic type. This diluent should be completely miscible with the oil. In addition, if the sample stream is a multiple-phase system, the diluent should be of such character and used in such amount as to convert the sample stream from a heterogeneous to a homogeneous or single-phase system. Various alcohols can be employed to serve any or all such functions. In addition, however, it is desirable that the diluent be of such character and used in such amount as to increase the conductivity of the sample stream to such extent that its resistivity is about $10^6$ ohm cms., or lower, when employing commercial glass electrodes. In this connection, it is desirable that the solvent contain a small amount of distilled water.

Various alcohols can be employed as the diluent with varying degrees of effectiveness and with or without small amounts of water, such as ethyl, methyl, propyl, isopropyl, normal butyl, secondary butyl, and amyl alcohol. If water is employed with the alcohol, reduced resistivities will result, and the water content desirably approaches, but should never exceed, that required to saturate the alcohol. If the sample stream is a multiple-phase system, e. g., an oil containing dispersed aqueous droplets, the alcohol diluent should be of such character and should have such small amount of water that a homogeneous or single-phase system will be obtained. The preferred alcoholic diluent is secondary butyl or isopropyl alcohol, containing a few per cent of distilled water, preferably an amount of water approaching, but somewhat less than, saturation value. Extensive tests have shown that secondary butyl alcohol is distinctly to be preferred as the most versatile diluent applicable to various oils and their distillates. The preferred diluent comprises secondary butyl alcohol containing about 6% water, by volume.

The amount of the alcoholic diluent mixed with the sample stream will vary with different oils and will be controlled to effect the desiderata noted above. Usually, the amount of alcoholic diluent will be from 50 to 150% of the volume of the sample stream. In operating on mineral oil distillates and with the preferred secondary butyl alcohol containing about 6% of water, the volume of the alcoholic diluent preferably is substantially equal to that of the sample stream.

It is desirable that the sample stream be continuously and intimately mixed with a stream of the alcoholic diluent. It is also desirable that the two streams be proportioned accurately. This makes desirable the use of two small proportioning pumps preferably of the positive displacement type, both pumps being driven in synchronism from a single drive means. In Fig. 1, two such pumps are diagrammatically indicated by the numerals 34 and 35. As shown, each pump includes a cylinder 36 into which a small plunger 37 extends, this plunger being reciprocated with an adjustable stroke by a suitable scotch yoke, cam, or crank, diagrammatically represented in Fig. 1 by connection of the plungers 37 of the pumps 34 and 35 by scotch yokes respectively to rotary members 39 and 40, each driven at the same speed, as by a motor 41, the drive connections being represented by dotted lines 42. Each of the pumps 34, 35 provides the usual intake and discharge valves (not shown in Fig. 1). The pump 34 receives the sample stream from the pipe 30 and meters and discharges it under pressure through a pipe 44 to an arm 45 of a mixer 46, best shown in Fig. 2. The diluent is contained in a container 47 and a pump-metered stream is withdrawn therefrom through a pipe 48 communicating with the intake of the pump 35. The discharge of this pump is through a pipe 49 to an arm 50 of the mixer 46.

The details of the preferred mixer 46 are best shown in Fig. 2. The pump-metered sample stream flowing into the arm 45 and the pump-metered stream of alcoholic diluent flowing through the arm 50 meet head on in a zone 51 to effect some degree of mixing at the point of collision or as the combined stream flows through a side arm 52 and through an auxiliary mixing device, indicated generally by the numeral 53. In the construction shown, a collar 54 is threaded to the side arm 52 and receives a pipe 55 leading to the electrometric cell 33. A short tube 56 is pressed into the side arm 52 and provides a seat for a ball 57 urged resiliently toward this seat by a spring 58 compressed between the ball and the end of the pipe 55. During passage between the seat and the ball 57, the stream is additionally mixed and the intensity of mixing is determined primarily by the compression of the spring 58. To obtain a greater or lesser mixing action, the collar 54 may be turned to bring the end of the pipe 55 closer to, or more removed from, the side arm 52, the ends of the collar 54 being reversely threaded to accomplish this. To obtain a greater adjustment, the spring 58 may be replaced by a spring of increased or decreased strength.

It is very desirable that the diluted sample stream passing through the pipe 55 to the electrometric cell 33 be homogeneous or single-phase and that the reaction of the reagent on any component of the oil be complete before entering the cell. To minimize the time lag in the control system, it is often desirable that the sample stream be withdrawn from the pipe 13 immediately beyond the place where the oil and reagent have been mixed, the sampling device 25 being desirably disposed close to the mixing valve 17 or the junction 15. This, together with the fact that substantial time is required for many reagents to react with the oil, often results in the presence of unreacted reagent in the sample stream. Rather than await normal equilibrium and thus impose a serious time lag on the system, the reaction is substantially accelerated in a multiple-phase system by conversion into a homogeneous or single-phase system, this being one of the functions of the alcoholic diluent.

The details of the preferred electrometric cell 33 are best shown in Figs. 1 and 3. Referring thereto, the cell includes, in general, a glass electrode 60 and a reference electrode preferably comprising the calomel electrode 61, respectively disposed in separate containers 62 and 63. The glass electrode 60 contains the usual internal solution 64 and is suspended in the container 62 from an air-tight closure 65, the internal solution 64 being connected to the usual output lead 66. The diluted sample stream from the pipe 55 enters the container 62 just above the lower end of the glass electrode 60 and leaves this container through an overflow 68 having an entrance portion a distance below the glass electrode and an exit portion disposed somewhat above the lower end of the glass electrode 60 and preferably above the opening of the pipe 55. In this way a constantly-renewed body 69 of the liquid of the diluted sample stream is maintained in the container 62 to submerge the lower working end of the glass electrode. This body of liquid 69 should preferably be of rather small volume so that the small diluted sample stream continuously renews it and moves in laving relationship with the submerged bulb of the glass electrode. Correspondingly, it is desirable that the container 62 be relatively small. This condition is also made desirable by the fact that the effluent liquid discharging through the overflow is either discarded or delivered to a suitable alcohol-recovery system for re-use in the system. Even with large-volume major stream flowing through the pipe 10, it is usually sufficient to employ sample streams of very small volume, e. g., 0.5 to 5 ml./min., or thereabouts. With such flow rates, the container 62 can be made quite small, usually having a diameter of about ½ to 1″. With such small equipment, the volume of alcoholic diluent required is very small, often as little as 1 liter a day, thus reducing costs of the diluent to a very low value.

The arrangement between the glass electrode 60 and the reference electrode, typified as the calomel electrode 61, is believed to be new, irrespective of whether a calomel electrode or some other reference electrode is employed. This is particularly true as to the liquid bridge between the electrodes and the method of constantly renewing the interface between the bridging liquid, usually a salt solution, and the body of liquid 69. The illustrated arrangement employs the usual calomel electrode 61 comprising an inner tube 70 closed at its lower end, the extreme tip containing a small body of mercury 71 in contact with a superimposed body of calomel 72, above which the inner tube 70 is packed with crystals of the salt, typically KCl, employed for the salt bridge. The inner tube 70 provides a small orifice 73 therethrough. Surrounding the inner tube 70 is a larger tube 74, the intervening space being filled with a solution of the same salt which communicates through a suitable orifice 74a with the intermediate section of a capillary space between a ground glass sleeve 75 and a correspondingly-tapered lower portion of the tube 74. In the preferred construction, the inner and outer tubes are supported from the top of the container 63, as by a liquid-tight plug 76. The usual output lead 77 extends through the plug 76 and to the body of mercury 71. Other forms of calomel cells can also be used.

The liquid bridge between the calomel electrode 61 and the glass electrode 60 is formed in part by the salt solution previously described and in part by a similar solution, usually an aqueous KCl solution, filling the space between the container 63 and its tube 74 and filling a small conduit 78 which enters the container 62 and terminates in an orifice or tip 79, preferably disposed below the glass electrode and slightly above the entrance portion of the overflow 68. The salt solution or other bridging liquid is preferably continuously renewed to eliminate contamination of the calomel electrode by the liquid to be tested, and to perform other functions to be later mentioned. This is accomplished by a very slow flow of the salt solution from a container 80 through a pipe 81, as controlled by a valve 82, the solution entering the upper portion of the container 63 and flowing downwardly therein and through the small conduit 78 to discharge drop by drop from the tip 79 as slowly-forming droplets 83. This discharge accumulates a small pool 84 of the salt solution in the bottom of the container 62 and which is in contact with the body of liquid 69 at an interface 85. Even though additional salt solution is continuously supplied through the small conduit 78, the interface 85 never rises substantially above the position shown as any such tendency to rise results in sweeping a portion of the salt solution upward in the overflow 68 due to the continuous flow therethrough.

This method of continuously renewing the bridging liquid and discharging same into the container 62 has many advantages. In the first place, it gives a definite liquid-junction potential between the bridging liquid and the liquid to be tested. If the pool 84 were static and its interface 85 were relied upon to establish the junction potential, the alcohol from the body 69 would gradually diffuse into the pool 84 of the bridging liquid and reduce its solubility for the contained salt, e. g., KCl, to cause precipitation thereof. Correspondingly, it is desirable that the liquid-junction potential be obtained across a constantly-renewed interface. Some degree of improvement can be obtained even if the tip 79 is disposed in submerged position within the pool 84, but greatly improved action has been found to result from a system in which the tip 79 is disposed slightly above the interface 85. In this latter instance, any varying or indeterminate liquid-junction potential is completely eliminated as this potential is established at a constantly-renewed drop interface. The slowly forming droplets 83 permit contact between the liquid of the body 69 and a constantly-renewed or constantly fresh surface of the bridging liquid in a manner to minimize dehydration effects at the interfacial surface, which would otherwise result in varying or indeterminate liquid-junction potentials.

The electrometrically-derived potential between output leads 66 and 77 is supplied to any suitable reagent-control equipment in such manner as to vary the supply of the reagent through the pipe 10 to maintain the acidity or alkalinity, otherwise herein-expressed as the hydrogen ion concentration, of the stream in the pipe 18 substantially constant even with variations in the character or composition of the oil. The potential between output leads 66 and 77 is preferably supplied to a pH meter 87, which is diagrammatically shown as including an amplifier 88 having its input circuit connected to the leads 66, 77 and having in its output circuit a suitable impedance 90 connected in series with a meter 91, which may be a milliammeter calibrated in pH units. Such pH meters are commercially available and excellent results have been obtained by use of a Beckman model R meter, which incorporates the elements thus far diagrammatically illustrated. The meter 91 provides for visual indication of the hydrogen ion concentration existing in the diluted sample stream, albeit that this indication is in terms of pH units, and the desirable reading on non-aqueous systems will not usually correspond numerically to the pH values commonly known with reference to aqueous systems, as will be later explained.

A suitable controller 92 receives the potential of the output leads 66, 77, as amplified by amplifier 88. For example, conductors 93 and 94 may be tapped across a portion of the impedance 90 and connected to the controller 92. This controller incorporates an additional amplifier, the output of which produces control forces of substantial magnitude in either one of two ways, as follows.

In the so-called electric-type controller, this output may be delivered to an electric motor driving a gear-reduction unit capable of producing a rotary control force. Alternatively, the gear-reduction unit may drive a crank to produce a reciprocating control force. Either the aforesaid rotary or reciprocating control forces may be applied directly or indirectly to a valve 95 in the pipe 10 to vary the throttling action thereof and thereby vary the amount of reagent delivered through the pipe 10 to the junction 15.

In the so-called pneumatic-type controller exemplified in Fig. 1, the output of the controller amplifier is delivered to an electrically-operated valve which controls the flow of air through a pipe 96 to and from a diaphragm unit 97 to control the pressure on the right-hand side of a diaphragm 98 connected to a stem 99 of the valve 95 to change its throttling action. Compressed air is supplied to the controller 92 through a pipe 100, the air supply to the pipe 96 being controlled by the electric valve. It should be understood that the illustrated pneumatic-type controller 92 used with the pH meter 87 is exemplary of one of a number of means comprehended by the invention for actuating the control valve 95 in response to changes in electrical output of the electrometric cell 33.

The invention comprehends that the amount of reagent supplied through the pipe 10 to the oil stream flowing in the pipe 11 be under the control of the electrometric cell 33. This amount of reagent can be controlled in one of a number of ways, two ways being suggested in Fig. 1. In the first place, a reagent of predetermined concentration may be retained in a tank 101, from which it is withdrawn through a pipe 102 communicating with a pumping means 103 which pressures the reagent and delivers it through the control valve 95 to the pipe 10. In this instance the pumping means 103 is preferably a centrifugal pump or a reciprocating pump containing a by-pass line for preventing excessive pressures in the pipe 10 ahead of the valve 95, either pumping system supplying reagent to the valve 95 at a relatively constant pressure. In this system, the volume of a reagent of predetermined concentration is controlled.

In the second place, the volume of the reagent supplied to the pipe 11 may be relatively constant, while the concentration thereof is varied under the action of the electrometric cell 33. This system is particularly suited to installations where the reagent comprises two components, e. g., an acid or alkali and a carrier such as water, alcohol, etc. In such an exemplary system, a relatively concentrated acid or alkaline solution may be present in the tank 101 and withdrawn therefrom by the pumping means 103 under control of the valve 95, as previously mentioned. In addition, the carrier liquid, e. g., water, alcohol, etc., may be retained in a tank 105 from which it is withdrawn through a pipe 106 by a pumping means 107, preferably coupled with the pumping means 103 through a connection suggested by dotted line 108, this connection extending to a suitable drive means, not shown. The pumping means 107 pressures the withdrawn stream and delivers it through pipe 109 and a valve 110 to the pipe 10 at a junction 111 beyond the valve 95, where it mixes with the stream in the pipe 10 to form the reagent continuously mixed with the oil stream in the pipe 11.

In accordance with the present invention, it has been found possible to obtain electrical potentials between output leads 66 and 77 which vary with the hydrogen ion concentration of the liquid of the diluted sample stream entering the electrometric cell 33 through the pipe 55. By the same token, it will be apparent that this electrical potential varies with the acidity or alkalinity, i.e., the hydrogen ion concentration, of the sample stream or the stream conducted by the pipe 18 to the equipment 20. The invention contemplates such control of the amount of reagent supplied, for example, through the pipe 10 as will maintain a predetermined hydrogen ion concentration in any or all of such streams, e. g., the maintenance of the hydrogen ion concentration thereof substantially constant at an experimentally or empirically determined value. In non-aqueous systems, to which the present invention is very well suited, the aforesaid hydrogen ion concentration is not necessarily numerically equal to the hydrogen ion concentration commonly referred to in aqueous systems, nor to its negative logarithm expressed in terms of pH, although it is related thereto. Fig. 4 suggests typical variations as between aqueous and non-aqueous systems and illustrates titration curves of acids of the same dissociation constant in aqueous and non-aqueous systems. In Fig. 4, ordinates represent indicated pH values such as can be read from the meter 91 of the pH meter 87, while the abscissa scale represents the amount of alkali added. In an aqueous system, titration of the acids in question will produce a curve of the type indicated by the numeral 112, with an inflection point in the vicinity of pH 7, representing neutralization of the acids in the aqueous system. In a non-aqueous system, titration of the acids in question will produce a curve of the type indicated by the numeral 114 having an inflection point or zone suggested by the numeral 115 substantially higher on the ordinate scale than with the aqueous system, e. g., between pH 10.5 and 11.0, as compared with about pH 7.0 in the aqueous system. Titration of non-aqueous systems may produce a multiplicity of such inflection points or zones, and the invention is particularly sensitive if adjusted to supply an amount of reagent corresponding to that required at an inflection point or zone. This is particularly true as the titration curve is steeper in such an inflection zone than elsewhere, wherefore a small change in the amount of reagent, e. g., as represented between dotted lines 116 and 117, produces a maximum change in indicated pH or hydrogen ion concentration, e. g., as suggested between dotted lines 118 and 119 which, in this instance, correspond approximately to pH 10.5 and pH 11.0. As the inflection point or zone represents the zone in which certain acids of the oil are neutralized, the invention can be employed with a high degree of sensitivity in installations where it is desired to neutralize certain acids contained in the oil stream. It should be understood, however, that the invention is not limited to operation at any particular hydrogen ion concentration or indicated pH as it can be set to control at any hydrogen ion concentration or indicated pH.

The invention can be applied to the neutralization or partial neutralization of various animal, vegetable, or mineral oils containing acids, either naturally present or because of prior processing. In other instances, the invention is applicable to the acid treatment of such oils, either to react with alkaline materials present or with acid-reactable components of the oil, as in the acid refining of mineral oil distillates.

While the invention has been more particularly described with reference to non-aqueous systems where it is desirable to mix a diluent with the sample stream, it should be clear that many features of the invention can be employed with aqueous systems in the control of the amount of reagent. In this latter event, it is usually unnecessary to add a diluent to the sample stream, although such diluent can be used to advantage, particularly where the aqueous stream, moving along the pipe 18 and to which reagent has been added through the pipe 10, has a pH or hydrogen ion concentration too high for accurate indication on the usual pH meter 87. In controlling the supply of reagent used in formulating such aqueous systems, the numerical values read from the meter 91 will correspond to those commonly known in the art, e. g., inorganic acids will be completely neutralized at pH 7.

Various changes and modifications can be made without departing from the spirit of the invention as defined in the appended claims.

I claim as my invention:

1. A continuous reagent-control method, including the steps of: continuously mixing streams of oil and a reagent reactable with at least some component of the oil to form an oil-continuous multi-phase major stream; continuously sampling said major stream by withdrawing a small sample stream therefrom; continuously mixing with said sample stream an alcoholic diluent miscible with the phases of said sample stream to form a diluted stream containing a small amount of homogeneously distributed water; continuously electrometically determining the hydrogen ion concentration of the diluted stream; and controlling in accordance with said determination the amount of said reagent continuously mixed with said stream of oil to maintain the hydrogen ion concentration of the diluted stream substantially constant.

2. A method as defined in claim 1, in which said continuous sampling of said major stream is performed by withdrawing therefrom a representative stream larger than required for said sample stream, and dividing said representative stream into a by-passed portion and another portion forming said sample stream.

3. A method as defined in claim 1, including the steps of separately pressuring the streams of oil and reagent before mixing the streams, and in which said continuous sampling of said major stream is performed by withdrawing therefrom a representative stream larger than required for said sample stream, dividing said representative stream into a by-passed portion and another portion forming said sample stream, and returning said by-passed portion to said oil stream ahead of the point of pressuring thereof.

4. A continuous reagent-control method, including the steps of: continuously mixing streams of oil and a reagent reactable with at least some component of the oil to form an oil-continuous major stream; continuously sampling said major stream by withdrawing a small sample stream therefrom shortly after it has been formed and before said reagent has completely reacted with said oil component; continuously mixing with said sample stream while still containing unreacted reagent an alcoholic diluent completely miscible therewith to quickly complete the reaction of said unreacted reagent and form a stream of a solution containing substantially no unreacted reagent and containing a small amount of dissolved water; electrometrically establishing a potential varying with the hydrogen ion concentration of said solution; and controlling the amount of said reagent continuously mixed with said stream of oil in response to changes in said potential to maintain said potential substantially constant.

5. A method of controlling the amount of a reagent that is continuously mixed with a stream of oil to produce a stream of an oil-continuous multiple-phase liquid, which method includes the steps of: continuously sampling said stream of multiple-phase liquid by withdrawing a small multiple-phase sample stream therefrom; converting said sample stream into a single-phase stream by mixing therewith an alcoholic diluent, said single-phase stream containing a small amount of water in solution; electrometrically establishing a potential varying with the pH of said single-phase stream; and controlling the amount of said reagent continuously mixed with said stream of oil in accordance with changes in said potential to maintain such potential substantially constant.

6. A method of controlling the amount of a reagent that is continuously mixed with a stream of oil to produce a stream of an oil-continuous multiple-phase liquid, which method includes the steps of: continuously sampling said stream of multiple-phase liquid by withdrawing a small multiple-phase sample stream therefrom; converting said sample stream into a single-phase stream by mixing therewith a common solvent soluble with the phases of said multiple-phase sample stream, said single-phase stream containing a small amount of water and having a resistivity no greater than $10^6$ ohm cms.; electrometrically testing said single-phase stream to establish an electrical potential varying with the hydrogen ion concentration of said single-phase stream; and employing said electrical potential to control the amount of said reagent continuously mixed with said stream of oil in a manner to maintain said potential substantially constant.

7. A continuous reagent-control method for trolling the amount of a reagent supplied to an oil and reactable with at least some component of the oil, said reagent being sufficiently immiscible with the oil to produce an oil-continuous dispersion when mixed therewith, which method includes the steps of: continuously mixing streams of said oil and said reagent to form a stream of said dispersion; continuously sampling said stream of said dispersion shortly after said dispersion has been formed to produce a sample stream of said dispersion; continuously mixing with said sample stream a stream of an alcoholic diluent containing a small amount of water to dissolve the phases of said dispersion of said sample stream to convert same into a homogeneous stream containing a small amount of water, the amount of said diluent being sufficient to reduce the resistivity of said homogeneous sample stream to a value no greater than about $10^6$ ohm cms.; electrometrically testing said sample stream to establish an electrical potential varying with the hydrogen ion concentration of said homogeneous stream; and employing said electrical potential to control the amount of said reagent continuously mixed with said stream of oil in a manner to maintain said potential substantially constant.

8. A method as defined in claim 7, in which said alcoholic diluent comprises secondary butyl alcohol.

9. A method of controlling the amount of an aqueous reagent that is continuously mixed with a stream of oil to produce a major oil-continuous stream containing a dispersed phase comprising reaction products, which method involves the use of a glass electrode and a reference electrode and which method includes the steps of: continuously sampling said major stream to produce a small sample stream; continuously mixing with said sample stream an alcoholic solvent for the oil and for the reaction products to produce a single-phase sample stream containing a small amount of dissolved water; electrometrically testing the single-phase sample stream by flowing same in contact with said glass electrode to establish between said glass electrode and said reference electrode an electrical potential; and employing said electrical potential to control the amount of said reagent continuously mixed with said stream of oil in a manner to maintain said potential substantially constant.

10. A method of controlling the amount of a reagent that is continuously mixed with a stream of oil to produce a major stream, which method involves the use of a glass electrode and a reference electrode and which method includes the steps of: continuously sampling said major stream to produce a small sample stream; mixing with the sample stream an alcoholic diluent to accelerate and complete promptly the reaction between said reagent and said oil and to produce a reacted sample stream, said reacted sample stream containing a small amount of water; submerging said glass electrode in a body of the liquid of said reacted sample stream while continuously renewing said body by delivering thereto at least a part of said reacted sample stream; continuously flowing a salt solution from a position which is in ionic communication with said reference electrode to said body of liquid in which said glass electrode is submerged, the electrical potential between said glass electrode and said reference electrode varying with the hydrogen ion concentration of said sample stream; and employing said electrical potential to control the amount of said reagent continuously mixed with said stream of oil in a manner to maintain said potential substantially constant.

11. A method as defined in claim 10, in which said salt solution is delivered to said body drop by drop in the vicinity of said glass electrode.

12. In an apparatus for controlling the amount of a reagent continuously delivered as a stream to a stream of oil and mixed therewith to form an oil-continuous multi-phase material flowing as a major stream, the combination of: a sampling means for withdrawing from said major stream a small sample stream; a source of a diluent completely miscible with said oil-continuous material; means for mixing with said small sample stream a stream of said diluent from said diluent source to form a stream of diluted single-phase liquid; means for developing an electrical potential varying with the hydrogen ion concentration of said diluted single-phase liquid, said means including a glass electrode, a reference electrode and a small body of said diluted single-phase liquid in contact with said glass electrode and in ionic communication with said reference electrode; means for delivering said stream of diluted single-phase liquid to said body to continuously renew same; control means for varying the amount of said reagent continuously delivered to and mixed with said stream of oil; and means for operating said control means in response to change in said electrical potential and in a manner to increase and decrease said amount of reagent delivered to said stream of oil upon respective decrease and increase in said electrical potential to maintain the hydrogen ion concentration of said diluted single-phase liquid substantially constant.

13. A combination as defined in claim 12, in which said means for mixing said sample stream and said diluent includes two small metering pumps respectively pumping and metering the liquid of said sample stream and said diluent, and a mixing means receiving the pumped streams for mixing same to produce said stream of diluted single-phase liquid.

14. A continuous method for controlling the addition of an aqueous solution of an alkali to an oil to form an emulsion therewith in neutralizing at least in part the acidity of the oil, which method includes the steps of: continuously sampling the stream of the emulsion to produce a small sample stream of the emulsion; continuously mixing with said sample stream an alcoholic solvent completely miscible with the emulsified phases of the sample stream to form a stream of a solution containing a small amount of dissolved water; electrometrically testing said stream of said solution to establish a potential varying with the hydrogen ion concentration thereof; and regulating the flow of the aqueous alkali solution mixed with the oil in accordance with changes in said potential and in amount sufficient to maintain said potential substantially constant.

15. A method of controlling the amount of a reagent that is continuously mixed with a stream of oil to react with a portion of the oil and produce a stream of oil-continuous multiple-phase liquid, which method includes the steps of: continuously sampling said stream of oil-continuous multiple-phase liquid by withdrawing a small multiple-phase sample stream therefrom; converting said sample stream into a single-phase stream by mixing therewith an alcoholic solvent containing a small amount of water and soluble in each of the phases of said sample stream; electrometrically testing said single-phase stream containing said small amount of water to develop a potential difference varying with the hydrogen ion concentration of said single-phase stream; and controlling the amount of said reagent continuously mixed with said stream of oil in accordance with said potential difference to maintain the hydrogen ion concentration of said single-phase stream substantially constant.

16. In an apparatus for continuously mixing a stream of oil and a stream of an aqueous reagent to form a major stream of multiple-phase oil-continuous material, the reagent stream mixed with the oil stream being regulated by a flow-control means, a control apparatus for regulating said flow-control means to compensate for changes in composition of said oil, said control apparatus including in combination: a sampling means for withdrawing from said major stream a small sample stream of multiple-phase oil-continuous material; diluting means for quickly completing the oil-reagent reaction and for converting said small sample stream into a stream of single-phase liquid, said diluting means including a source of a common solvent for said phases, two small metering pumps respectively intaking from said sampling means and said source, and a mixing means connected to said metering pumps to receive and mix the streams respectively metered thereby to produce a stream of said single-phase liquid; an electrometric cell including a small container providing inlet and outlet means and containing superimposed bodies of a bridging liquid and said single-phase liquid, said bodies contacting at an interface, said electrometric cell including a glass electrode in said container in contact with said body of single-phase liquid, said electrometric cell including a reference electrode in ionic communication with said body of bridging liquid whereby a potential difference is developed between said electrodes as a function of the hydrogen ion concentration of said single-phase liquid; means for connecting said mixing means to said inlet means of said container to flow said single-phase liquid through said container and from said outlet means to renew continuously said body of single-phase liquid; and means for adjusting said flow-control means in response to changes in said potential difference to maintain the hydrogen ion concentration of said single-phase liquid substantially constant.

17. A combination as defined in claim 16 including a tube containing said bridging liquid and providing one end communicating with said reference electrode and another end having a terminus communicating with the interior of said container, and including means for slowly flowing said bridging liquid along said tube to discharge into said container and join said body of bridging liquid therein, a corresponding amount of said bridging liquid flowing from said container through said outlet means.

18. A combination as defined in claim 17 in which said terminus of said tube comprises a small orifice opening on the interior of said container just above said interface to discharge said bridging liquid drop-by-drop in contact with said single-phase liquid to form constantly renewed drop interfaces.

19. A combination as defined in claim 18 in which said outlet means provides an entrance portion communicating with said container at a position adjacent said interface of said bodies of single-phase and bridging liquids to conduct both liquids from said bodies and maintain substantially constant the position of said interface.

20. A combination as defined in claim 16 including means for supplying additional bridging liquid to said body of bridging liquid in said container, said outlet means communicating with said body of single-phase liquid at a level adjacent said interface to withdraw both the single-phase liquid and the bridging liquid supplied to said container and to renew said interface.

21. In an electrometric control apparatus for the testing of oils containing a small amount of uniformly distributed water and which apparatus is adapted to establish an electrometric control potential varying as a function of the hydrogen ion content of such oil, the combination of: a first small container providing inlet and outlet means and containing superimposed bodies of a bridging liquid and said oil contacting at an interface near the level of said outlet means; a glass electrode; means for supporting said glass electrode to extend in said body of oil, the lowermost portion of said glass electrode being positioned above said interface; a second small container; a reference electrode in said second small container; a tube connecting said containers and providing a small orifice communicating with said first small container; means for slowly advancing a bridging liquid from said second container through said tube to said first container to discharge from said small orifice and join said body of bridging liquid in said first container to continuously renew same, said outlet means conducting a corresponding amount of said bridging liquid from said first container; and means for continuously delivering a small stream of said oil containing said small amount of water to said inlet means to renew said body of oil in said first container, said outlet means conducting from said first container an amount of said oil corresponding to the amount of oil delivered to said inlet means.

22. An apparatus as defined in claim 21 in which said small orifice of said tube communicates with said body of oil at a position adjacent said interface to discharge said bridging liquid drop-by-drop in contact with said body of oil to form constantly renewed interfaces between the drops of bridging liquid and the oil.

JAMES G. SUTHARD.

REFERENCES CITED

The following references are of record in the file of this patent:

UNITED STATES PATENTS

| Number | Name | Date |
|---|---|---|
| 1,530,833 | Keeler | Mar. 24, 1925 |
| 2,047,985 | Weir | July 21, 1936 |

OTHER REFERENCES

Gettman, Outlines of Theoretical Chemistry, John Wiley and Sons, N. Y., 1918, pp. 229. (Copy in Div. 59.)

Evans, Determination of Acidity in Insulating Oil, I. and E. Chemistry, Analytical Edition, 8, 1936, pp. 287–291. (Copy in Scientific Library.)